United States Patent
Lin

(10) Patent No.: US 9,361,782 B2
(45) Date of Patent: Jun. 7, 2016

(54) ARTICLE ANTI-LOST DEVICE AND METHOD

(71) Applicant: Chao-Hung Lin, Kaohsiung (TW)

(72) Inventor: Chao-Hung Lin, Kaohsiung (TW)

(*) Notice: Subject to any disclaimer, the term of this patent is extended or adjusted under 35 U.S.C. 154(b) by 0 days.

(21) Appl. No.: 14/476,072

(22) Filed: Sep. 3, 2014

(65) Prior Publication Data

US 2016/0042633 A1    Feb. 11, 2016

(30) Foreign Application Priority Data

Aug. 11, 2014    (TW) .............................. 103127475 A

(51) Int. Cl.
| | | |
|---|---|---|
| G08B 21/24 | (2006.01) | |
| G08B 13/14 | (2006.01) | |
| G08B 21/02 | (2006.01) | |
| H04M 1/725 | (2006.01) | |
| G08B 25/10 | (2006.01) | |

(52) U.S. Cl.
CPC ............ *G08B 21/24* (2013.01); *G08B 13/1427* (2013.01); *G08B 21/0227* (2013.01); *G08B 21/0236* (2013.01); *G08B 21/0247* (2013.01); *G08B 21/0263* (2013.01); *G08B 21/0266* (2013.01); *G08B 21/0288* (2013.01); *G08B 21/0294* (2013.01); *G08B 25/10* (2013.01); *H04M 1/72516* (2013.01)

(58) Field of Classification Search
CPC .......... G08B 21/0247; G08B 13/1427; G08B 21/0288; G01S 13/74; H04M 1/72516
USPC ................. 340/686.6, 573.4, 539.13, 539.15, 340/539.1, 568.1
See application file for complete search history.

(56) References Cited

U.S. PATENT DOCUMENTS

| | | | | |
|---|---|---|---|---|
| 5,525,967 A * | 6/1996 | Azizi | ...................... | G01S 13/74 340/539.1 |
| 5,841,352 A * | 11/1998 | Prakash | ............. | G08B 21/0247 340/539.1 |
| 6,515,588 B1 * | 2/2003 | Sarabia | .............. | G08B 13/1427 340/539.1 |
| 6,747,555 B2 * | 6/2004 | Fellenstein | ........ | G08B 13/1427 340/539.1 |
| 7,327,251 B2 * | 2/2008 | Corbett, Jr. | ........ | G08B 21/0261 340/539.13 |
| 7,333,776 B1 * | 2/2008 | York | ................... | G08B 13/1427 340/686.6 |
| 2006/0250255 A1 * | 11/2006 | Flanagan | ........... | G08B 21/0247 340/539.15 |

* cited by examiner

*Primary Examiner* — John A Tweel, Jr.
(74) *Attorney, Agent, or Firm* — C. G. Mersereau; Nikolai & Mersereau, P.A.

(57) ABSTRACT

An article anti-lost device comprises a plurality of sensors and a host. Each sensor comprises a recognition module and a sensor signal transceiver module. The host comprises a control module, a host signal transceiver module, a host warning module, an operation module and a display module. In an article anti-lost method, the host and the sensor are firstly paired, and then the sensor is combined with a to-be-monitored article and a warning distance is set. When a distance between the sensor and the host exceeds the warning distance, a warning signal is outputted, and an orientation and a distance of the sensor are prompted on the host. With the structure and the method, when the article leaves the user by a predetermined distance, the user can be reminded to prevent the article from getting lost or stolen.

9 Claims, 5 Drawing Sheets

ARTICLE ANTI-LOST DEVICE AND METHOD

BACKGROUND OF THE INVENTION (1) Field of the Invention

The invention relates to an article anti-lost device and an article anti-lost method, and more particularly to the article anti-lost device and method capable of immediately reminding a user when an article leaves the user by a predetermined distance to prevent the article from getting lost or stolen.

(2) Description of the Prior Art

The modern human being has the busy life, so the article, such as the mobile phone, purse, glasses, notebook computer, carry-on baggage or the like carried therewith, or even the accompanying child, companion, family or old person, often tends to be forgotten, lost, or robbed due to temporary lack of attention. More particularly, some parents or teachers led the kids out to play, and the kids tend to be in danger due to negligence of their being unaware that the kids have left the presence of the parents or teachers. For example, the previously reported news regarding the tragedy that a kid suffocated on a kindergarten school bus when the bus reaches the campus because the teacher and the driver have left the kid on the bus due to the lack of attention.

SUMMARY OF THE INVENTION

A main object of the invention is to help the people regret from happening due to negligence or preventing the of an important article due to lack of attention, and to curb the evil individuals from stealing property of busy persons or in a store.

The invention provides an article anti-lost device comprising a plurality of sensors and a host. The sensors are apt to be combined with a to-be-monitored article and be carried along with a monitoring person. Each of the sensors comprises a recognition module having identification data and a sensor signal transceiver module connected to the recognition module. The host comprises a control module having logic, operation and storage functions and a host signal transceiver module, a host warning module, an operation module and a display module, which are connected to the control module. The control module can transmit and exchange signals with the sensor signal transceiver module and the recognition module of the sensor through the host signal transceiver module, so that the sensor and the host are paired to form a unique correlation, and a distance between the sensor and the host can be judged. The host warning module generates a warning signal when the distance between the paired sensor and host exceeds a predetermined warning distance, and the operation module can perform operations of pairing between the host and the sensor and setting the warning distance in conjunction with the display module.

The invention also provides an article anti-lost method comprising a monitoring process, which comprises the following steps. First, a host and a sensor are paired. Then, the sensor is combined with a to-be-monitored article or person. Next, a warning distance is set on the host, and a "monitor mechanism" is performed. Thus, when a distance between the sensor and the host exceeds the warning distance, the host outputs a warning signal to remind a user, while the host also prompts an orientation and a distance of the sensor to facilitate the user in searching. After the user found the sensor, the user can select whether to continue performing the "monitor mechanism".

The invention further provides an article anti-lost method further comprising a host anti-lost searching process. The host anti-lost searching process comprises the following steps. First, a password and a to-be-transmitted mobile phone are set on the host. Then, a GPS positioning module is turned on and a "host anti-lost mechanism" is performed. Thus, when the host is lost and an error password is inputted to the host, the host automatically and continuously transmits GPS data of a current position of the host to the set mobile phone, and the user can obtain the current position of the host according to the GPS data received by the mobile phone to facilitate the searching of the host. After the user finds the host, the user can stop the host from continuously transmitting the GPS data, and can select whether to continue performing the "host anti-lost mechanism".

The article anti-lost device and method of the invention can firstly perform the frequency binding and pairing between the host and a plurality of sensors, and set the corresponding name and warning distance, so that the host can monitor the plurality of sensors, and then the monitored sensors are combined with or attached to the to-be-monitored articles, persons or pets, respectively. Thus, when the host starts performing the monitor mechanism, the host and the monitored sensors transmit and exchange signals to and from each other in a wireless manner, so that the host can judge the positions and distances of the monitored sensors. When one of the monitored sensors exceeds the predetermined warning distance, the host generates a warning signal to remind the user and notify the user that which article, person or pet has escaped from the safe range. Thus, the user can immediately react according to the warning signal to prevent the regret from happening due to the negligence or to prevent the important article from being forgotten due to lack of attention, or even can immediately curb the evil individuals from stealing property of the busy person or in a store. In addition, the password and the to-be-transmitted mobile phone can be set and the GPS positioning module can be turned on in advance in the host. Thus, once the host is lost and an error password is inputted to the host, the host automatically and continuously transmits the GPS data of the current position of the host to the predetermined mobile phone, so that the user can easily find the host using the mobile phone.

Further aspects, objects, and desirable features of the invention will be better understood from the detailed description and drawings that follow in which various embodiments of the disclosed invention are illustrated by way of examples.

DETAILED DESCRIPTION OF THE PREFERRED EMBODIMENTS

Figure 1:
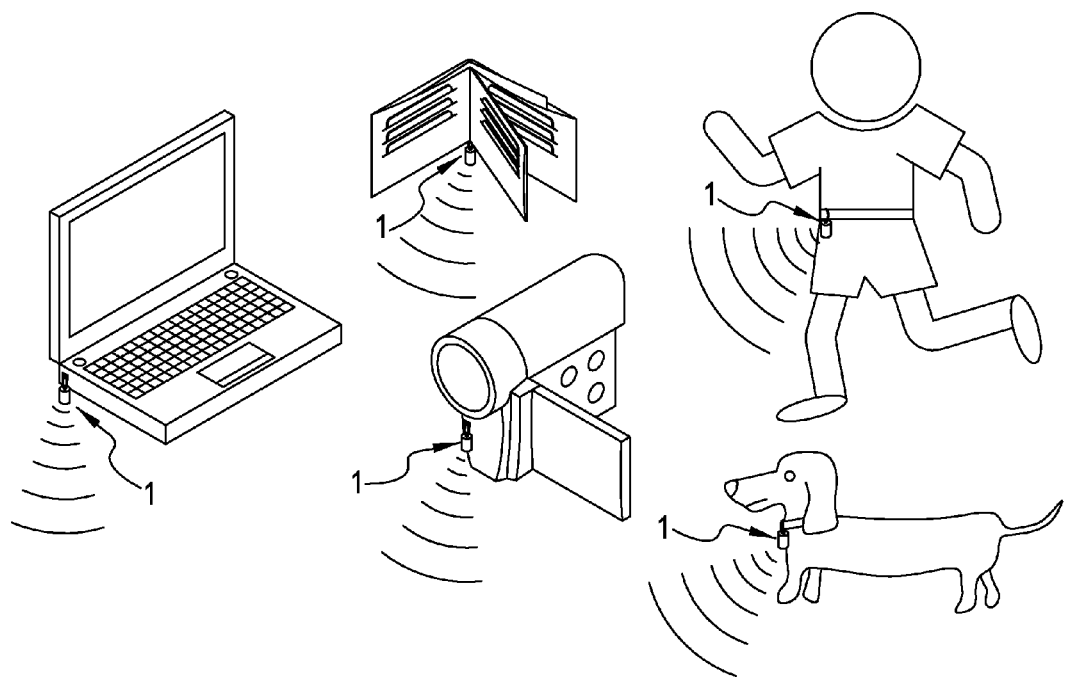
FIG. 1 is a schematic view showing a structure of the invention.
Figure 1:
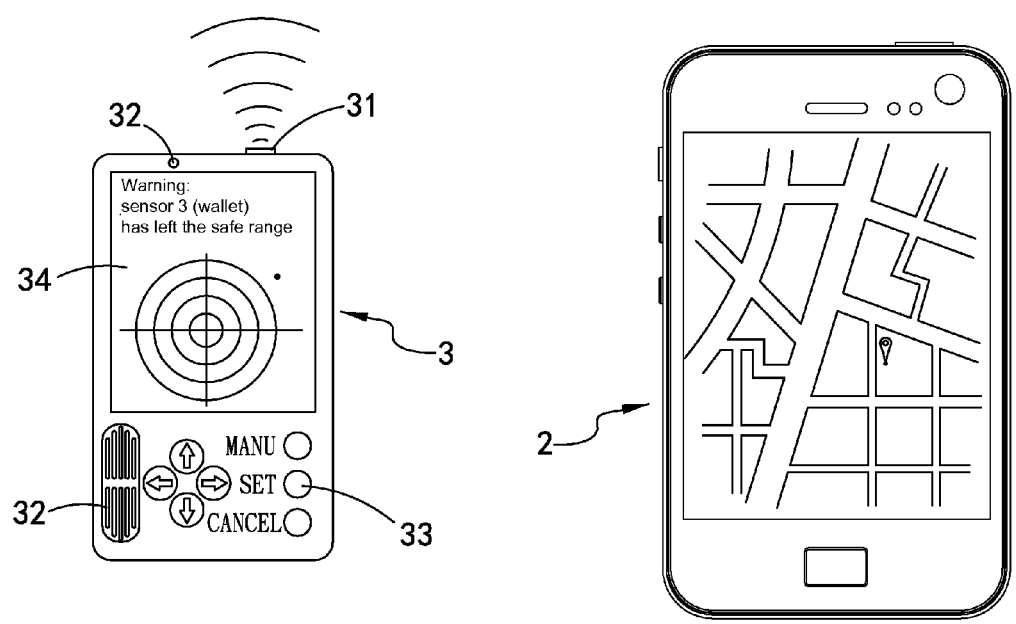
Figure 2:
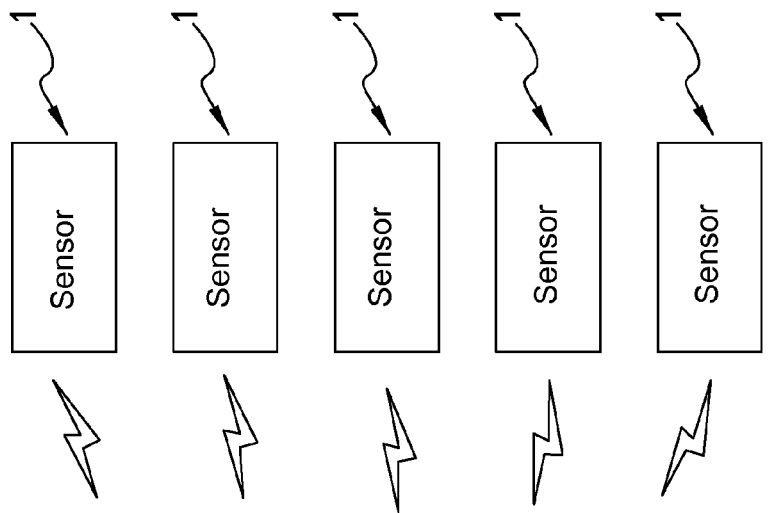
FIG. 2 is a schematic block diagram showing a system of the invention.
Figure 2:
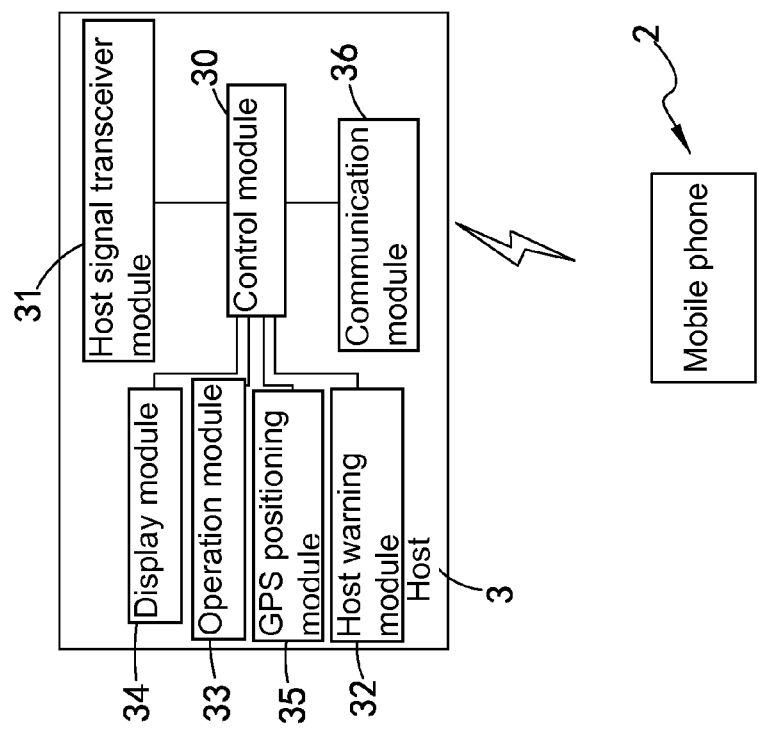
Figure 3:
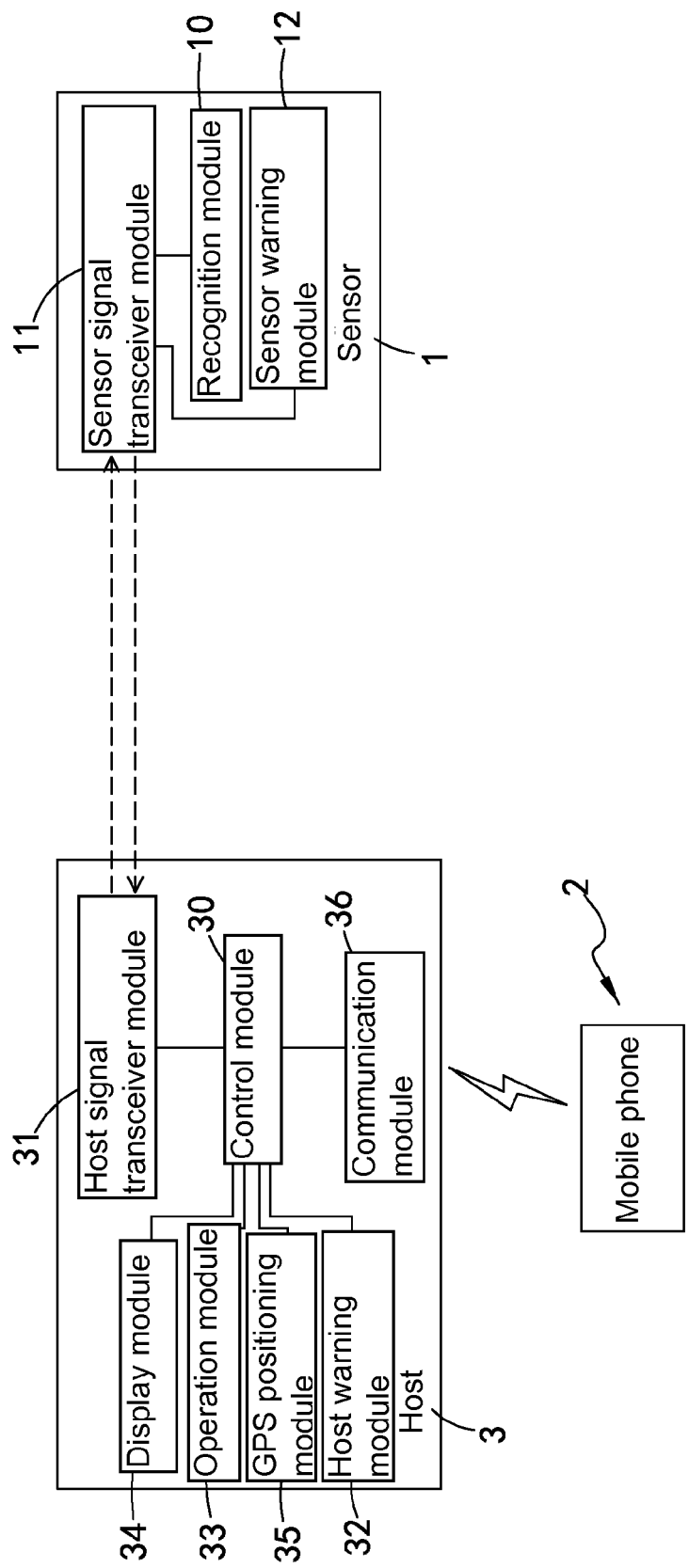
FIG. 3 is a schematic block diagram showing a detailed system of a host and a sensor of the invention.

Referring to FIGS. 1 to 3, the article anti-lost device of the invention comprises a plurality of sensors 1, a mobile phone 2 and a host 3.

The plurality of sensors 1 may be in the form of straps, stickers, bracelets, which are apt to be combined with an article or can be easily carried along and worn by persons and pets. Each sensor 1 comprises a recognition module 10 having identification data and a sensor signal transceiver module 11 and a sensor warning module 12 both connected to the recognition module 10. The sensor warning module 12 comprises a warning light and/or an alarm. In addition, when a distance between the sensor 1 and the host 3 exceeds a predetermined warning distance, the sensor warning module 12 can generate the corresponding warning signal.

The mobile phone 2 has global positioning system (GPS) and map functions.

The host 3 comprises a control module 30 having logic, operation and storage functions, and a host signal transceiver module 31, a host warning module 32, an operation module 33, a display module 34, a GPS positioning module 35 and a communication module 36, all of which are connected to the control module 30. The control module 30 can transmit and exchange signals with the sensor signal transceiver module 11 and the recognition module 10 of the sensor 1 through the host signal transceiver module 31, so that the sensor 1 and the host 3 are paired to form an unique correlation, and the distance between the sensor 1 and the host 3 can be judged. The host warning module 32 comprises a warning light and/or an alarm, and generates a constant-frequency warning signal when the distance between the paired sensor 1 and host 3 exceeds a predetermined warning distance. When the host 3 is closer to the sensor 1, the warning signal has the higher frequency. The operation module 33 can perform operations of pairing between the host 3 and the sensor 1, setting the corresponding name, setting the warning distance, setting a booting password and binding to the mobile phone 2 in conjunction with the display module 34. When the GPS positioning module 35 is turned on, the GPS data of a current position of the host 3 may be obtained. The communication module 36 continuously transmits the GPS data of the current position of the host 3 to the mobile phone 2 when the control module 30 judges an input error of the booting password, and the mobile phone 2 can obtain the location of the host 3 through the GPS and map functions, so that the host 3 can be found according to the location.

In this invention, the recognition module 10 may be a radio frequency identification (RFID) chip, the sensor signal transceiver module 11 may be a RFID antenna, and the host signal transceiver module 31 may be a RFID reader.

Figure 4:
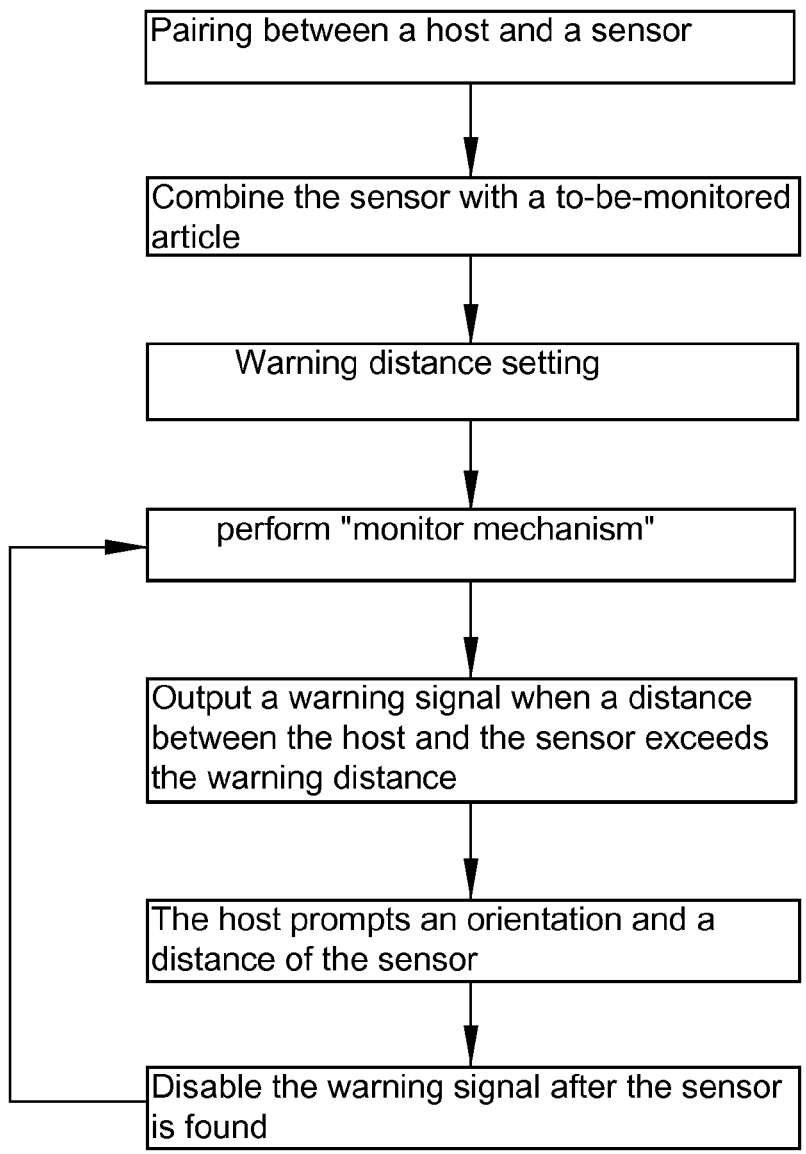
FIG. 4 is a schematic view showing a monitoring process of the invention.

Referring to FIG. 4, the article anti-lost method of the invention comprises a monitoring process, which comprises the following steps.

(a) The host 3 and the sensor 1 are paired, in which the host 3 and the sensor 1 are paired to form a unique correlation by way of frequency binding.

(b) The sensor 1 is combined with a to-be-monitored article, in which the paired sensor 1 is combined with the to-be-monitored article, person or pet by way of adhering or hanging.

(c) A warning distance is set, in which the warning distance between the paired sensor 1 and host 3 is set on the host 3.

(d) A "monitor mechanism" is performed, in which an option of "monitor mechanism" on the host 3 is enabled.

(e) When the distance between the host 3 and the sensor 1 exceeds the warning distance, a warning signal is outputted, in which when the distance between the host 3 and the sensor 1 exceeds the warning distance, the host 3 and the sensor 1 output warning signals, such as flashes or alarms.

(f) The host 3 prompts an orientation and a distance of the sensor 1, in which the basic data, a position, an orientation and the distance of the sensor 1 are displayed on a screen of the host 3.

(g) After the sensor 1 is found, the warning signal is disabled, in which the sensor 1 is found according to the position, orientation and distance of the sensor 1 displayed on the screen of the host 3, and the host 3 is utilized to disable the warning signal, and then a selection is made to go back to the step (d) to continue monitoring the sensor 1 or to stop monitoring the sensor 1.

Figure 5:
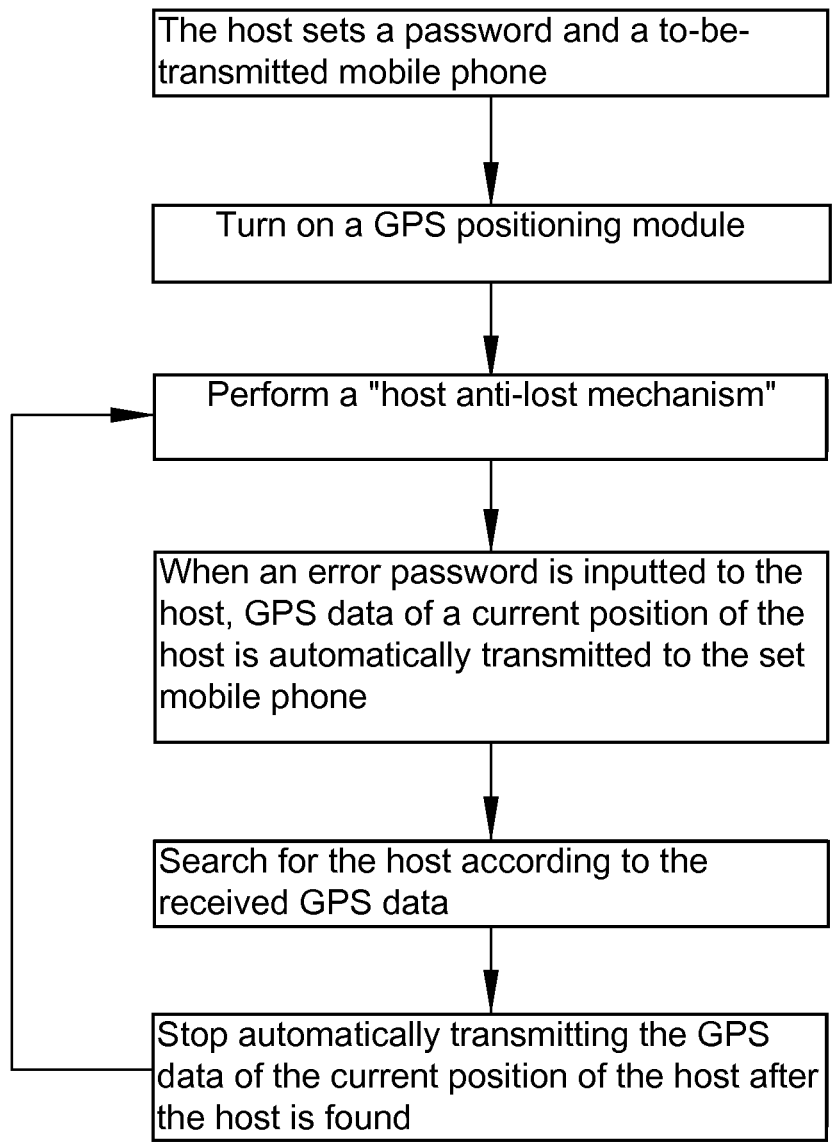
FIG. 5 is a schematic view showing an anti-lost searching process of the host of the invention.

Referring to FIG. 5, the article anti-lost method of the invention further comprises a host anti-lost searching process, which comprises the following steps.

(h) The host 3 sets a password and a mobile phone 2 to be transmitted, in which a booting password and the mobile phone 2 for transmitting the GPS data of the current position of the host 3 are set in the host 3.

(i) The GPS positioning module 35 on the host 3 is turned on to obtain the GPS data of the current position of the host 3.

(j) A "host anti-lost mechanism" is performed, in which an operation of "host anti-lost mechanism" on the host 3 is enabled, (k) When the input password of the host 3 has an error, the GPS data of the current position of the host 3 is automatically transmitted to the set mobile phone 2, in which when the booting password of the host 3 has an error, the host 3 automatically transmits the GPS data of the current position of the host 3 to the set mobile phone 2 every period of time.

(l) The host 3 is searched according to the received GPS data, in which after the mobile phone 2 receives the GPS data, the location of the host 3 can be obtained through the GPS and map functions.

(m) After the host 3 is found, the automatic transmitting of the GPS data of the current position of the host 3 is stopped, in which after the host 3 is found using the mobile phone 2, the correct booting password is inputted to the host 3, and the automatic transmitting of the GPS data is stopped, and then a selection is made to go back to the step (j) to continue performing the "host anti-lost mechanism" or to stop performing the "host anti-lost mechanism".

The article anti-lost device and method of the invention can firstly perform the frequency binding and pairing between the host 3 and the plurality of sensors 1, and set the corresponding name and warning distance, so that the host 3 can monitor the plurality of sensors 1, and then the monitored sensors 1 are combined with or attached to the to-be-monitored articles, persons or pets, respectively. Thus, when the host 3 starts performing the monitor mechanism, the host 3 and the monitored sensors 1 transmit and exchange signals to and from each other in a wireless manner, so that the host 3 can judge the positions and distances of the monitored sensors 1. When one of the monitored sensors 1 exceeds the predetermined warning distance, the host 3 generates a warning signal to remind the user and notify the user that which article, person or pet has escaped from the safe range. Thus, the user can immediately react according to the warning signal to prevent the regret from happening due to the negligence or to prevent the important article from being forgotten due to the official busy, or even can immediately curb the evil individuals from coveting after the property of the busy person or store. In addition, the password and the to-be-transmitted mobile phone 2 can be set and the GPS positioning module 35 can be turned on in advance in the host 3. Thus, once the host 3 is lost and an error password is inputted to the host 3, the host 3 automatically and continuously transmits the GPS data of the current position of the host 3 to the predetermined mobile phone 2, so that the user can easily find the host 3 using the mobile phone 2.

New characteristics and advantages of the invention covered by this document have been set forth in the foregoing description. It is to be expressly understood, however, that the drawings are for the purpose of illustration only and are not intended as a definition of the limits of the invention. Changes in methods, shapes, structures or devices may be made in details without exceeding the scope of the invention by those who are skilled in the art. The scope of the invention is, of course, defined in the language in which the appended claims are expressed.

What is claimed is:

1. An article anti-lost device, comprising:
    a plurality of sensors apt to be combined with a to-be-monitored article and be carried along with a monitoring person, wherein each of the sensors comprises a recognition module having identification data and a sensor signal transceiver module connected to the recognition module;
    a host, comprising a control module having logic, operation and storage functions and a host signal transceiver module, a host warning module, an operation module and a display module, which are connected to the control module, wherein the control module can transmit and exchange signals with the sensor signal transceiver module and the recognition module of the sensor through the host signal transceiver module, so that the sensor and the host are paired to form a unique correlation, and a distance between the sensor and the host can be judged, wherein the host warning module generates a warning signal when the distance between the paired sensor and host exceeds a predetermined warning distance, and the operation module can perform operations of pairing between the host and the sensor and setting the warning distance in conjunction with the display module; and
    a mobile phone having global positioning system (GPS) and map functions, wherein the host further comprises a GPS positioning module and a communication module, GPS data of a current position of the host can be obtained when the GPS positioning module is turned on, the operation module can perform operations of setting a booting password and binding to the mobile phone in conjunction with the display module, and when the control module judges an input error of the booting password, the control module automatically transmits the GPS data of the current position of the host to the mobile phone through the communication module, so that the mobile phone obtains a location of the host through the GPS and map functions.

2. The article anti-lost device according to claim 1, wherein each of the sensors further comprises a sensor warning module, which generates the warning signal when the distance between the sensor and the host exceeds the predetermined warning distance.

3. The article anti-lost device according to claim 2, wherein the host warning module comprises a warning light and an alarm, and the sensor warning module comprises a warning light and an alarm.

4. The article anti-lost device according to claim 3, wherein when the distance between the sensor and the host exceeds the predetermined warning distance, the host warning module generates a constant-frequency warning signal, and the warning signal of the host warning module has a higher frequency when the host gets closer to the sensor.

5. The article anti-lost device according to claim 3, wherein when the distance between the sensor and the host exceeds the predetermined warning distance, the display module of the host displays basic data, a position, an orientation and a distance of the sensor.

6. The article anti-lost device according to claim 1, wherein the recognition module is a radio frequency identification (RFID) chip, the sensor signal transceiver module is a RFID antenna, and the host signal transceiver module is a RFID reader.

7. An article anti-lost method comprising a monitoring process, the monitoring process comprising the steps of:
    (a) pairing between a host and a sensor, in which the host and the sensor are paired to form a unique correlation by way of frequency binding;
    (b) combining the sensor with a to-be-monitored article, in which the paired sensor is combined with the to-be-monitored article or a person by way of adhering or hanging;
    (c) setting a warning distance, in which the warning distance between the paired sensor and host is set on the host;
    (d) performing a "monitor mechanism", in which the monitor mechanism is enabled on the host;
    (e) outputting a warning signal when a distance between the host and the sensor exceeds the warning distance, wherein the warning signal comprising a flash or an alarm;
    (f) displaying basic data, a position, an orientation and a distance of the sensor on a screen of the host;
    (g) disabling the warning signal after the sensor is found, in which the sensor is searched according to the position, orientation and distance of the sensor displayed on the screen of the host, and the host is utilized to disable the warning signal, and then a selection is made to go back to the step (d) to continue monitoring the sensor or to stop monitoring the sensor;
    a host anti-lost searching process, which comprises:
    (h) setting a booting password and a mobile phone for transmitting GPS data of a current position of the host in the host;
    (i) turning on a GPS positioning module on the host to obtain the GPS data of the current position of the host;
    (j) performing a "host anti-lost mechanism", in which the "host anti-lost mechanism" is enabled on the host;
    (k) automatically transmitting the GPS data of the current position of the host to the set mobile phone when an input error of the booting password of the host occurs, in which the host automatically transmits the GPS data of the current position of the host to the set mobile phone every period of time when the booting password of the host has an error;
    (l) searching for the host according to the received GPS data, in which a location of the host is obtained according to GPS and map functions after the mobile phone receives the GPS data; and
    (m) stopping automatically transmitting the GPS data of the current position of the host after the host is found, in which after the mobile phone is utilized to find the host, the correct booting password is inputted in the host and automatic transmitting of the GPS data is stopped, and then a selection is made to go back to the step (j) to continue performing the "host anti-lost mechanism" or to stop the "host anti-lost mechanism".

8. The article anti-lost method according to claim 7, wherein in the step (e) of the monitoring process, when the distance between the host and the sensor exceeds the warning distance, the sensor also outputs the warning signal, and the host may also disable the warning signal of the sensor in the step (g).

9. The article anti-lost method according to claim 7, wherein in the step (e) of the monitoring process, when the distance between the host and the sensor exceeds the warning distance, the sensor also outputs the warning signal, and the host may also disable the warning signal of the sensor in the step (g).

* * * * *